United States Patent
Hwang

(10) Patent No.: US 8,620,382 B2
(45) Date of Patent: Dec. 31, 2013

(54) COGNITIVE RADIO COMMUNICATION SYSTEM BASED ON COOPERATION SIGNAL PROVIDED BY ANOTHER SYSTEM

(75) Inventor: Chan Soo Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 714 days.

(21) Appl. No.: 12/469,389

(22) Filed: May 20, 2009

(65) Prior Publication Data

US 2010/0062785 A1   Mar. 11, 2010

(30) Foreign Application Priority Data

Sep. 11, 2008  (KR) .................. 10-2008-0089693

(51) Int. Cl.
*H04B 1/38* (2006.01)
(52) U.S. Cl.
USPC ........... 455/561; 455/447; 370/329; 370/330; 370/338; 370/348
(58) Field of Classification Search
USPC ....................................................... 455/561
See application file for complete search history.

(56) References Cited

U.S. PATENT DOCUMENTS

| | | | |
|---|---|---|---|
| 6,571,102 B1 | 5/2003 | Hogberg et al. | |
| 6,842,618 B2 | 1/2005 | Zhang | |
| 7,158,796 B2 | 1/2007 | Tiedemann, Jr. et al. | |
| 7,362,832 B2 * | 4/2008 | Yoshida | 375/348 |
| 2002/0115409 A1 * | 8/2002 | Khayrallah | 455/41 |
| 2005/0068920 A1 | 3/2005 | Zhang | |
| 2006/0222121 A1 * | 10/2006 | Uchikawa et al. | 375/347 |
| 2006/0262758 A1 * | 11/2006 | Sandhu et al. | 370/338 |
| 2007/0002766 A1 * | 1/2007 | Park et al. | 370/254 |
| 2008/0025248 A1 * | 1/2008 | Naden | 370/321 |
| 2008/0090572 A1 * | 4/2008 | Cha et al. | 455/436 |
| 2010/0099352 A1 * | 4/2010 | Lee et al. | 455/15 |
| 2010/0278136 A1 * | 11/2010 | Oyman et al. | 370/330 |

FOREIGN PATENT DOCUMENTS

| | | |
|---|---|---|
| KR | 10-2004-0093630 | 11/2004 |
| WO | WO 2004/084450 | 9/2004 |

* cited by examiner

*Primary Examiner* — Liton Miah

(74) *Attorney, Agent, or Firm* — NSIP Law

(57) ABSTRACT

An apparatus and method of facilitating cooperation within a cognitive radio communication system. The cooperation system facilitated in the communication system by another communication system. The apparatus include: a receiver to receive an uplink signal from a mobile station and a cooperation signal from a second communication system, wherein the cooperation signal is associated with the uplink signal; an evaluator to evaluate a contribution of the cooperation signal with respect to detection of the uplink signal; and a radio resource management unit to control an available radio resource for the second system according to the contribution of the cooperation signal.

18 Claims, 8 Drawing Sheets

COGNITIVE RADIO COMMUNICATION SYSTEM BASED ON COOPERATION SIGNAL PROVIDED BY ANOTHER SYSTEM

CROSS-REFERENCE TO RELATED APPLICATION

This application claims the benefit under 35 U.S.C. §119(a) of a Korean Patent Application No. 10-2008-0089693, filed on Sep. 11, 2008, in the Korean Intellectual Property Office, the entire disclosure of which is incorporated herein by reference.

BACKGROUND

1. Field

The following description relates to a cognitive radio communication system. More particularly, the description relates to an apparatus and method of facilitating cooperation within a cognitive radio communication system.

2. Description of Related Art

An efficient use for limiting radio resources, such as limiting frequency resources, is required in cognitive radio communication. A cognitive radio base station and cognitive radio terminals that belong to a second system may recognize an available frequency band in a first system and transmit and receive data using the recognized available frequency band.

However, a first system has priority with respect to the available frequency band. Accordingly, where a signal of the second system may collide with a signal of the first system, it may be necessary for the second system to stop communication operations or change a using frequency band to another frequency band.

The second system may recognize the available frequency band using various types of schemes. For example, the second system may charge a predetermined fee and thereby recognize a frequency band that is not being used in the first system. The second system may periodically or aperiodically sense frequency bands that are not used in the first system, to secure the available frequency band. The second system may share channel information and transmission signal information with the first system. Through this, the second system may secure the available frequency band without disturbing communications of the first system.

SUMMARY

In one general aspect, a base station in a first communication system includes a receiver to receive an uplink signal from a mobile station and a cooperation signal from a second communication system, wherein the cooperation signal is associated with the uplink signal; an evaluator to evaluate a contribution of the cooperation signal with respect to detection of the uplink signal; and a radio resource management unit to control an available radio resource for the second communication system according to the contribution of the cooperation signal.

The evaluator may evaluate the contribution of the cooperation signal based on improvement of a data transmission rate of the uplink signal or improvement of a signal-to-noise ratio.

The evaluator may further evaluate the contribution of the cooperation signal based on an amount of interference that is created in the first communication from use of the controlled available radio resource.

The base station in the first communication system also may include a detector to detect the received uplink signal using the received cooperation signal.

The detector may detect the received signal by processing the received uplink signal and the received cooperation signal to achieve a diversity gain.

The base station may generate first soft decision information of the received uplink signal for performing a soft decision of the uplink signal, the cooperation signal may include second soft decision information generated by the second communication system for performing a soft decision of the uplink signal, and the detector may combine the first soft decision information and the second soft decision information to detect the received uplink signal.

The cooperation signal may include digital information indicating quantizing of a received signal of a second communication system, and the detector may combine the quantized received signal of the digital information and the received uplink signal to detect the received uplink signal.

The base station may generate first hard decision information for the received uplink signal for performing a hard decision of the uplink signal, the cooperation signal may include second hard decision information generated by the second communication system for performing hard decision of the uplink signal, and the detector may combine the first hard decision information and the second hard decision information to detect the received uplink signal.

The radio resource management unit may increase availability of the available radio resource for the second communication system as the contribution of the cooperation signal increases.

The controlled available radio resource may be configured to provide communication between a second base station and a second mobile station belonging to the second communication system.

In yet another general aspect, a base station includes a receiver to receive an uplink signal of a first mobile station; a cooperation signal generator to generate a cooperation signal associated with at least one of soft decision information for performing a soft decision for the received uplink signal; digital information that is generated by quantizing the received uplink signal; and hard decision information for performing a hard decision for the received uplink signal; a transmitter to transmit the cooperation signal to a second base station; and a radio resource recognition unit to recognize an available radio resource allocated by the second base station based on a contribution of the cooperation signal with respect to detection of the uplink signal by the second base station.

The base station also may include a communication unit to communicate with a second mobile station using the recognized available radio resource.

In another general aspect, a base station of a communication system, the base station includes a receiver to receive an uplink signal from a source mobile station; a first signal generator to generate a first signal associated with at least one of soft decision information for performing a soft decision for the received uplink signal, digital information that is generated by quantizing the received uplink signal, and hard decision information for performing a hard decision for the received uplink signal; a transmitter to transmit the first signal to a destination mobile station; an evaluator to evaluate a contribution of a second signal generated by a second communication system, the second signal associated with the received uplink signal, with respect to the destination mobile station detecting the received uplink signal; and a radio resource management unit to control availability of radio resource to a second communication system according to the evaluated contribution of the second signal.

The evaluator may evaluate the contribution of the second signal based on the amount of interference that is caused in the first communication system when the second communication system uses the controlled available radio resource.

In another general aspect, a method of operating a base station in a first communication system includes receiving at a receiver an uplink signal from a mobile station and a cooperation signal from a second communication system, wherein the cooperation signal is associated with the uplink signal; detecting by a detector the received uplink signal using the received cooperation signal; evaluating by an evaluator a contribution of the cooperation signal with respect to detection of the uplink signal; and controlling by a radio resource management unit availability of radio resource to the second communication system according to the contribution of the cooperation signal.

The evaluating may include evaluating the contribution of the cooperation signal based on an amount of interference that is caused in the first communication system when the second communication system uses the controlled available radio resource.

The method of operating the base station in the first communication system also may include the generating first soft decision information of the received uplink signal for performing a soft decision of the received uplink signal, wherein the receiving may include receiving the cooperation signal which includes second soft decision information generated by the second communication system for performing a soft decision for the uplink signal, and the detecting may include combining the first soft decision information and the second soft decision information to detect the received uplink signal.

In another general aspect, a computer-readable recording medium storing a program is configured to cause a base station to receive an uplink signal from a mobile station and a cooperation signal from a second communication system, wherein the cooperation signal is associated with the uplink signal; detect the received uplink signal using the received cooperation signal; evaluate a contribution of the cooperation signal with respect to detection of the uplink signal; and control availability of a radio resource to the second communication system according to the contribution of the cooperation signal.

Other features will become apparent to those skilled in the art from the following detailed description, which, taken in conjunction with the attached drawings, discloses exemplary embodiments.

BRIEF DESCRIPTION OF THE DRAWINGS

Throughout the drawings and the detailed description, unless otherwise described, the same drawing reference numerals will be understood to refer to the same elements, features, and structures. The size and scale of the elements may be exaggerated for clarity and convenience.

DETAILED DESCRIPTION

The following detailed description includes an exemplary first system that includes a "first base station" or a "primary base station" (hereinafter "PBS") and a "first mobile station" or "primary mobile station" (hereinafter "PMS"). The detailed description also includes an exemplary second system that includes a "second base station" or "secondary base station" (hereinafter "SBS") and a "second mobile station" or a "secondary mobile station" (hereinafter "SMS"). The detailed description is provided to assist the reader in gaining a comprehensive understanding of the methods and systems described herein. Accordingly, various changes, modifications, and equivalents of the systems and methods described herein will be suggested to those of ordinary skill in the art. Also, descriptions of well-known functions and constructions may be omitted for clarity and conciseness.

Figure 1:
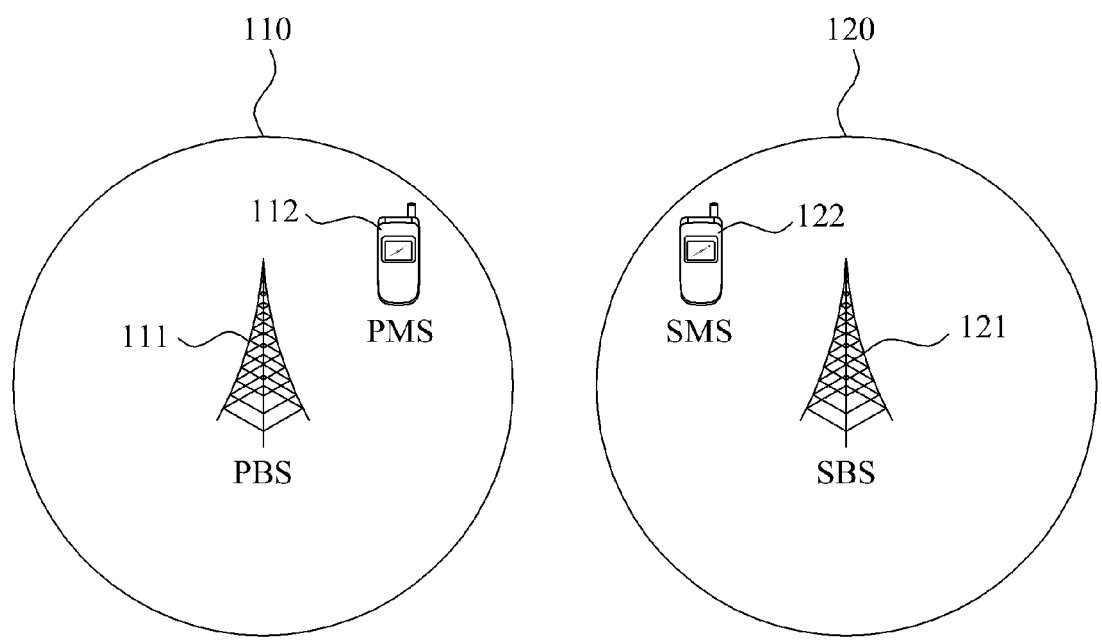
FIG. 1 is a diagram illustrating an exemplary system including a first system and a second system.

FIG. 1 is a diagram illustrating an exemplary system including a first system and a second system. The first system 110 includes a PBS 111 and a PMS 112. The second system 120 may include a SBS 121 and a SMS 122.

The SBS 121 and the SMS 122 of the second system 120 may determine an available frequency band from frequency bands that are of priority to the first system 110. The SBS 121 and the SMS 122 may communicate with each other using the available frequency band. However, the SBS 121 and the SMS 122 may not interrupt a communication of the first system 110 while communicating with each other over an available frequency band.

Various types of schemes may be used to appropriately allocate available frequency bands to the SBS 121 and the SMS 122. For example, in a "frequency broker" scheme, a frequency broker (not shown) may provide a first system 110 with a predetermined price for use of available frequency bands. A second system 120 is then charged the appropriate price for a right to use available frequency bands. Installation of the frequency broker may also add to the overall cost of this scheme in addition to the price that may be charged to the second system 110 for use of available frequency bands.

Another scheme may include a "sensing and sharing" frequency band scheme. According to this scheme, a second system 120 may sense a frequency band that is used by a first system 110 and a frequency band that is not used by the first system 110. The second system 120 may recognize the unused frequency band as an available frequency band and share in the use of the available band. However, if an error occurs while the second system 120 is sensing available frequency bands, it is possible that a collision may occur between the first system 110 and the second system 120. This may make it difficult to increase an overall channel capacity since the second system 120 may use only those frequency bands not in use by the first system 110.

Figure 2:
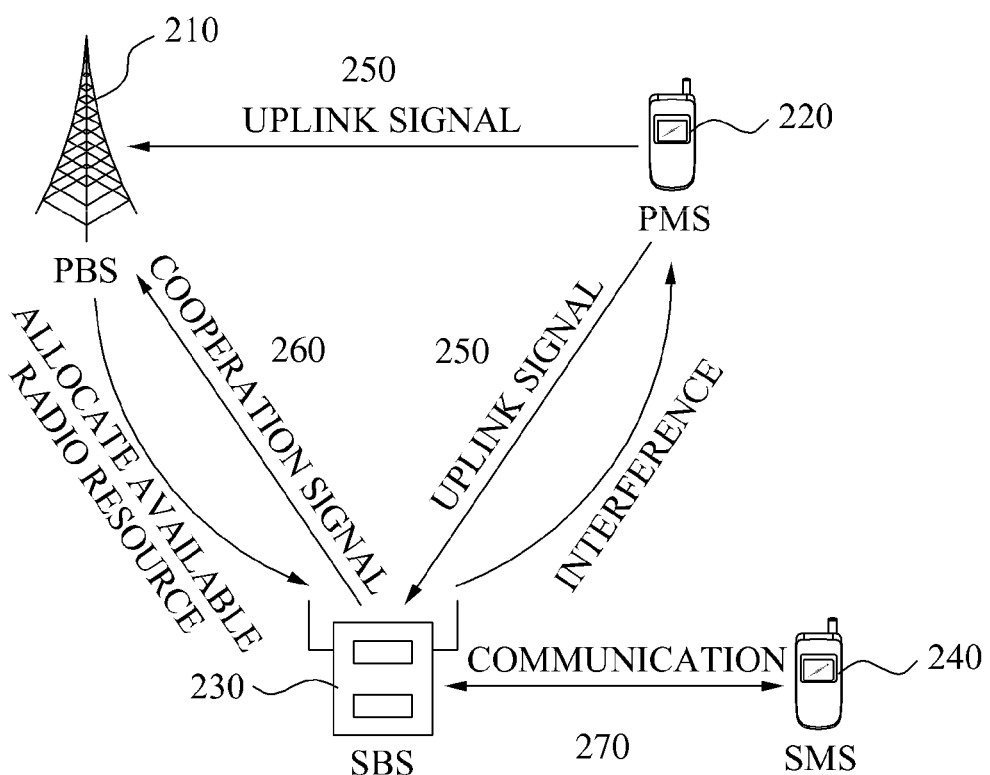
FIG. 2 is a diagram illustrating an exemplary system that includes a second system that facilitates detection of an uplink communication by a first system though use of a cooperation signal.

FIG. 2 is a diagram illustrating an exemplary system that includes a second system that facilitates detection of an uplink communication by a first system though use of a cooperation signal. FIG. 2 includes a PBS 210, a PMS 220, an SBS 230, an SMS 240, an uplink signal 250, a cooperation signal 260, and an available frequency band 270.

The SBS 230 of a second system may facilitate the uplink communication 250 between the PMS 220 and the PBS 210. The PBS 210 may evaluate a contribution of the cooperation signal 260 of the SBS 230 with respect to the uplink communication 250 and allocate the available frequency band 270 to the second system according to the evaluated contribution.

The SBS 230 and the SMS 240 may communicate with each other using the allocated available frequency band 270. The PMS 220 may transmit the uplink signal 250 during the uplink communication of the first system. The uplink signal 250 may be received by the PBS 210 and the SBS 230. The SBS 230 may generate the cooperation signal 260 based on the received uplink signal 250.

The cooperation signal 260 may facilitate detection of the uplink signal 250 by the PBS 210. For example, the cooperation signal 260 may include either hard decision information or soft decision information of the SBS 230 with respect to the received uplink signal 250, or a quantized received uplink signal (hereinafter, "digital information"). The hard decision information and the soft decision information may be information for performing a hard decision and performing a soft decision of the received uplink signal 250. The digital information may be information that is generated by quantizing the received uplink signal 250 by the SBS 230.

The PBS 210 and the SBS 230 may be wired or wirelessly connected to each other. The PBS 210 may receive the cooperation signal 260 and the uplink signal 250 via at least two independent channels and thus may achieve a diversity gain. More particularly, the PBS 210 may detect the uplink signal 250 using the cooperation signal 260. Accordingly, a signal-to-noise ratio (SNR) or a data transmission rate of the uplink signal 250 of the PBS 210 may increase.

The PBS 210 may evaluate a contribution of the cooperation signal 260 with respect to detection of the uplink signal 250 according to various types of schemes. For example, the PBS 210 may evaluate the contribution of the cooperation signal 260 based on an improved data transmission rate of the uplink signal 250; an improved SNR based on an improved data transmission rate of the uplink signal 250; an improved reception error rate of the PBS 210; an improved coverage of the PBS 210; and the like.

The PBS 210 may determine an available radio resource 270 for the SBS 230 and the SMS 240 based on the evaluated contribution of the cooperation signal 260, and may inform the SBS 230 of information associated with the determined available radio resource 270. The SBS 230 and the SMS 240 may communicate with each other using the available radio resource 270. Examples of a radio resource allocation scheme may include a scheme where a first system does not use a frequency band for a predetermined period of time while a second system uses the available or unused frequency band for an amount equal to or less than the predetermined period of time; a scheme where a first system and a second system simultaneously use a frequency band but the amount the second system may interfere with the first system is limited.

In FIG. 2, for example, it is assumed that the SBS 230 and the SMS 240 perform a downlink communication using the available radio resource 270. A downlink signal of the SBS 230 may be received by the PMS 220. The received downlink signal may function as an interference in the PBS 220. In particular, the interference may cause the data transmission rate of the first system to decrease. The PBS 210 may evaluate the contribution of the cooperation signal 260 by taking into account the interference. For example, as the amount of interference increases, the PBS 210 may determine the contribution of the cooperation signal is lowered and thereby allocate a relatively smaller amount of available radio resources 270 to the SBS 230 and SMS 240.

Figure 3:
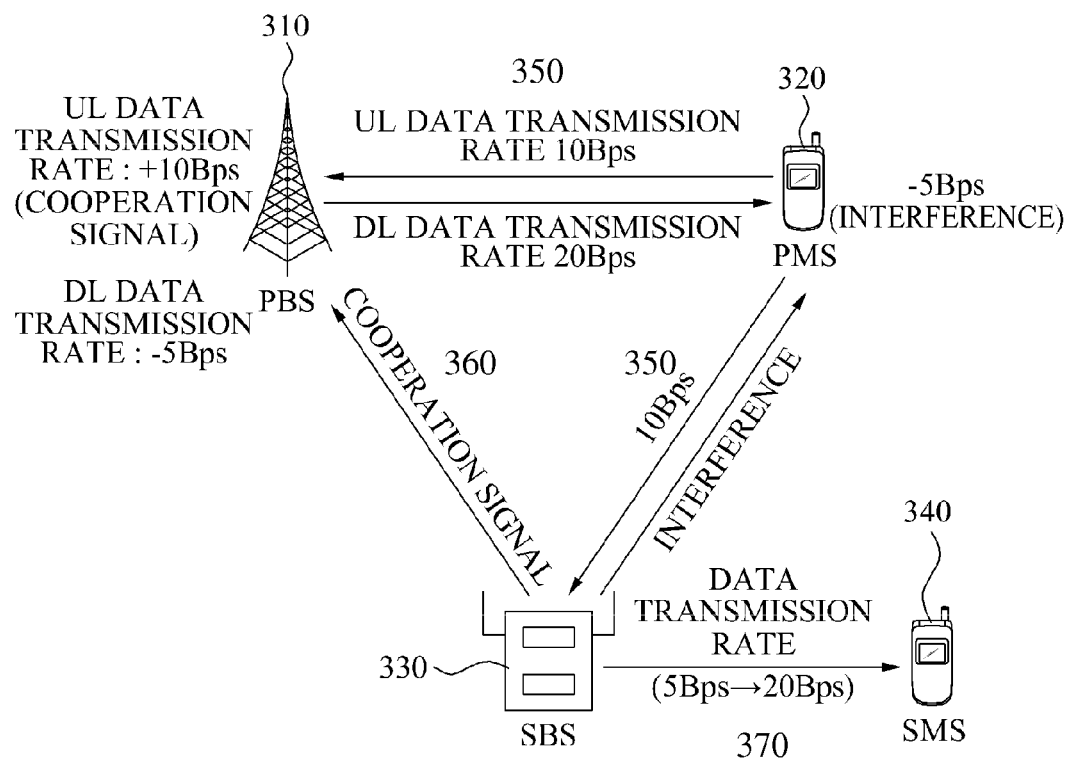
FIG. 3 is a diagram illustrating an example of data transmission rates in a first system and a second system.

FIG. 3 is a diagram illustrating an example of data transmission rates in a first system and a second system. FIG. 3 includes a PBS 310, a PMS 320, an SBS 330, an SMS 340, an uplink signal 350, a cooperation signal 360, and an available frequency band 370.

The PBS 310 may evaluate a contribution of the cooperation signal 360 based on an increased amount or a decreased amount of data transmission rates. For example, when the cooperation signal 360 does not exist and the PBS 310 detects an uplink signal of the PMS 320, the uplink data transmission rate 350 of the first system is about 10 Bps. Also, where the SBS 330 does not cause interference in the PMS 320, an initial downlink data transmission rate of the first system is about 20 Bps. The PMS 320 may transmit the uplink signal 350 to the SBS 330 at 10 Bps. A decreased amount of the downlink data transmission rate of the first system caused by the interference of the SBS 330 is about 5 Bps. An initial downlink data transmission rate of the second system is about 5 Bps. The SBS 330 may facilitate detection by the PBS 310 of the uplink signal using the cooperation signal 360. Accordingly, the uplink data transmission rate 350 of the first system may be improved due to the cooperation signal. Here, it is assumed that the uplink data transmission rate of the first system is improved by about 10 Bps.

When the uplink data transmission rate of the first system is improved due to the cooperation signal 360, the PBS 310 may evaluate the contribution of the cooperation signal 360 based on the improvement, 10 Bps, of the uplink data transmission rate 350. In particular, where the SBS 330 and the SMS 340 communicate with each other, the PBS 310 may evaluate the contribution of the cooperation signal 360 by additionally considering the decreased amount, −5 Bps, of the downlink data transmission rate of the first system that is caused by the SBS 330. The PBS 310 may control the available radio resource allocated to the second system based on the contribution of the cooperation signal 360.

In FIG. 3, for example, it is assumed that the second system ultimately performs communication using the available radio resource 370. In this instance, the uplink data transmission rate of the first system may increase by approximately 10 Bps and the downlink data transmission rate of the first system may decrease by approximately 5 Bps. Since the downlink data transmission rate of the second system increases by approximately 15 Bps, the entire throughput may be improved.

Figure 4:
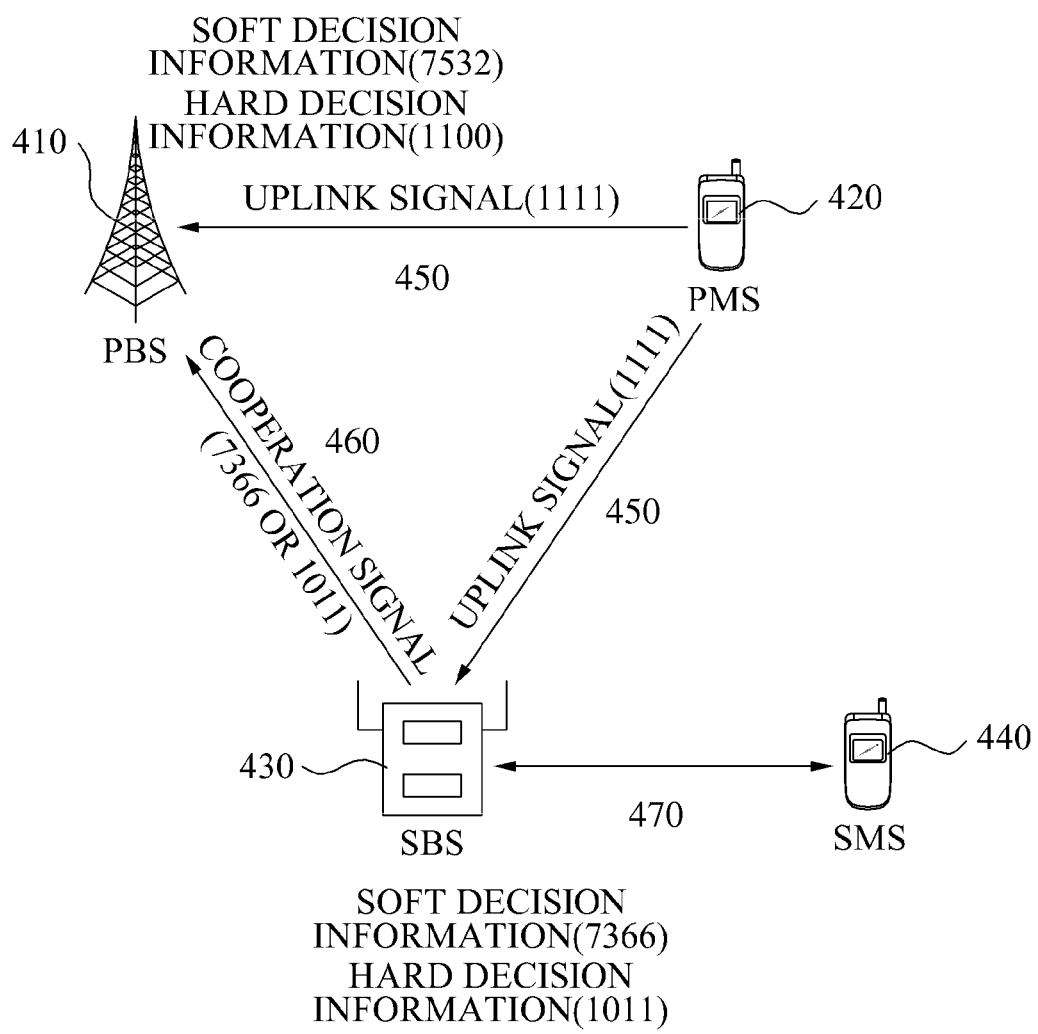
FIG. 4 is a diagram illustrating an exemplary system that includes a second system facilitating an uplink communication of a first system using soft decision information or hard decision information.

FIG. 4 is a diagram illustrating an exemplary system that includes a second system facilitating an uplink communication of a first system using soft decision information or hard decision information. FIG. 4 includes a PBS 410, a PMS 420, an SBS 430, an SMS 440, an uplink signal 450, a cooperation signal 460, and an available frequency band 470.

The SBS 430 may generate the cooperation signal 460 using various types of information based on the uplink signal 450 transmitted from the PMS 420. The SBS 430 may quantize the received uplink signal 450 and transmit the digital information as the cooperation signal to the PBS 410.

The SBS 430 may receive the uplink signal 450 of the PMS 420 and generate soft decision information for performing a soft decision for the received uplink signal 450. In FIG. 4, for example, the soft decision information may be a probability value indicating that each of the received information bits is a "0" or a "1." For example, the soft decision information may be associated with log-likelihood ratio (LLR) information.

The SBS 430 may quantize the probability value. For illustration, if the probability value is desired to be quantized into three bits, a calculated probability value may be mapped with any one of digital values 0, 1, 2, 3, 4, 5, 6, and 7. In such a case, the digital values correspond probability values as follows in Table 1.

TABLE 1

| Digital Value of Soft Decision Information Bit | Probability Value of Information Bit |
|---|---|
| 0 | 0.000 to 0.125 |
| 1 | 0.125 to 0.250 |
| 2 | 0.250 to 0.375 |
| 3 | 0.375 to 0.500 |
| 4 | 0.500 to 0.625 |
| 5 | 0.625 to 0.750 |
| 6 | 0.750 to 0.875 |
| 7 | 0.875 to 1.000 |

As a bit of the soft decision information approaches the digital value of "7," an information bit corresponding to the soft decision information bit will approach the probability value of "1," as can be seen in Table 1. Conversely, as the bit of soft decision information approaches the digital value of "0," the information bit corresponding to the bit of soft decision information approaches the probability value of "0." In FIG. 4, for illustration, it is assumed that information bits corresponding to the uplink signal 450 transmitted from the PMS 420 are "1111." The PMS 420 may modulate the information bits "1111" to at least one symbol to thereby transmit the uplink signal. The SBS 430 calculates probability values of information bits as "0.9," "0.4," "0.8," and "0.8" based on the received uplink signal and thereby generates the soft decision information as "7366," and the PBS 410 calculates probability values of information bits based on the received uplink signal 450 and thereby generates the soft decision information as "7532."

The SBS 430 may transmit the soft decision information "7366" to the PBS 410 as the cooperation signal 460. The PBS 410 may combine the soft decision information "7532" of the PBS 410 and the soft decision information "7366" of the PBS 430. This approach provides a more accurate result of the detection of the information bits of the uplink signal 450 by the PBS 410. The PBS 410 may achieve a diversity gain since the soft decision information "7532" and "7366" are associated with the uplink signal 450 and transmitted via two radio channels. For example, the PBS 410 may calculate an average of the soft decision information of the PBS 410 and the soft decision information of the SBS 430 in order to detect the received uplink signal 450. The PBS 410 may compare the calculated average with a predetermined threshold to thereby detect whether each of the information bits is a "1" or a "0." If the PBS 410 may detect the uplink signal 450 based on the soft decision information "7366" transmitted from the SBS 430. Accordingly, a number of errors existing in the uplink signal detected by the PBS 410, that is, the information bits may decrease.

Since, the PBS 410 and the SBS 430 may be generally connected to each other in a wired way, soft decision information may readily include a large number of bits. The SBS 430 may generate hard decision information "1011" by performing a hard decision based on the soft decision information "7366." Similarly, the PBS 410 may generate hard decision information "1100" by performing a hard decision based on the soft decision information "7532." Here, it can be known that errors exist in each of the hard decision information "1011" of the SBS 430 and the hard decision information "1100" of the PBS 410.

The SBS 430 may transmit the hard decision information "1011" to the PBS 410 as the cooperation signal 460. The PBS 410 may detect information bits of the uplink signal 450 by combining the hard decision information "1011" included in the cooperation signal 460 and the hard decision information "1100" of the PBS 410.

As illustrated in FIG. 4, the SBS 430 may transmit the cooperation signal 460 to aid the primary system 410 during detection of the uplink signal 450. The cooperation signal 460 may encompass at least one of the following: soft decision information; hard decision information; and/or digital information. The SBS 430 may be evaluated as the contribution of the cooperation signal. The PBS 410 may determine the available radio resource 470 for the second system based on the contribution of the cooperation signal 460.

Figure 5:
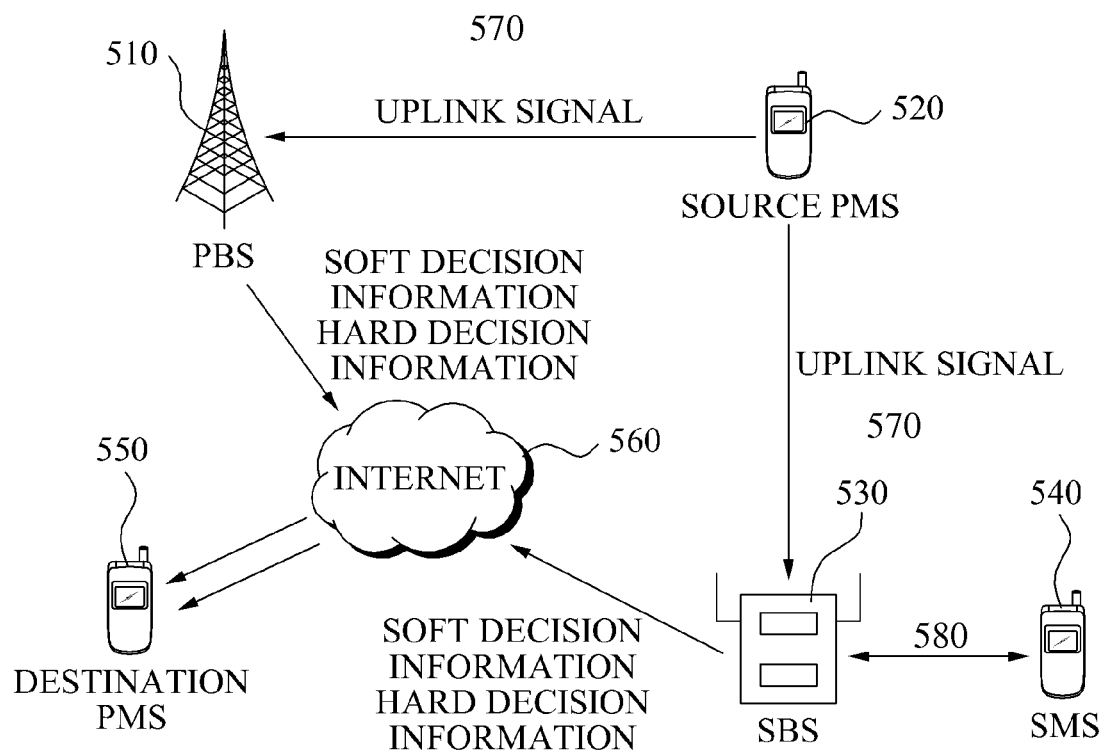
FIG. 5 is a diagram illustrating an exemplary system that includes a first system and a second system where a destination first mobile station exists.

FIG. 5 is a diagram illustrating an exemplary system that includes a first system and a second system where a destination first mobile station exists. FIG. 5 includes a PBS 510, a "source first mobile station" or a "source primary mobile station" (hereinafter "source PMS") 520, an SBS 530, an SMS 540, "destination first mobile system" or a "destination primary mobile station" (hereinafter "destination PMS") 550, an internet 560, an uplink signal 570, and an available frequency band 580.

The destination PMS 550 may combine soft decision information or hard decision information of a PBS 510 and soft decision information or hard decision information of an SBS 530 in order to achieve a diversity gain. The destination PMS 550 may detect an uplink signal 570 transmitted from source PMS 520 using the combination result.

The uplink signal 570 transmitted from the source PMS 520 may be received by the PBS 510 and the SBS 530. Each of the PMS 510 and the SBS 530 may generate the soft decision information or the hard decision information, and transmit the generated soft decision information or hard decision information to the destination PMS 550 via the Internet 560. The destination PMS 550 may detect the uplink signal 570 based on the soft decision information or the hard decision information included in the cooperation signal of the SBS 530.

The above contribution of the cooperation signal of the SBS 530 may be evaluated by the PBS 510. The PBS 510 may allocate an available radio resource 580 to the second system based on the evaluated contribution of the cooperation signal. The SBS 530 and the SMS 540 may communicate with each other using the allocated available radio resource 580.

Figure 6:
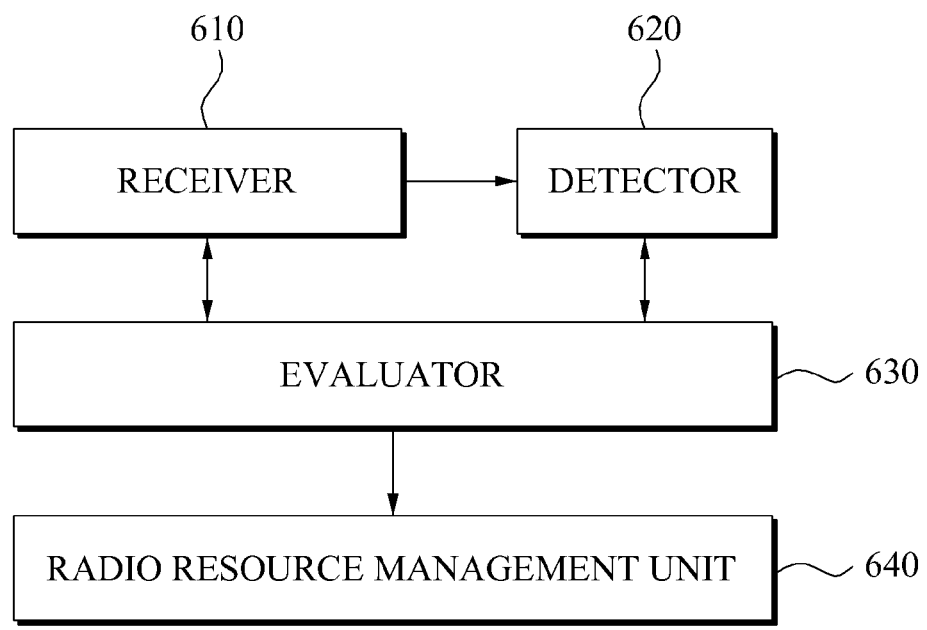
FIG. 6 is a block diagram illustrating an exemplary first base station.

FIG. 6 is a block diagram illustrating a PBS 410. The PBS 410 may include a receiver 610, a detector 620, an evaluator 630, and a radio resource management unit 640. The receiver 610 may receive an uplink signal from a PMS and receive a cooperation signal associated with the uplink signal from a second system.

The second system may include an SBS and an SMS. The cooperation signal may include soft decision information for performing soft decision for the uplink signal; hard decision information for performing hard decision for the uplink signal; or digital information. The digital information may be generated by quantizing a received signal of the SBS or the SMS.

The detector 620 may detect information bits of the uplink signal by processing the cooperation signal and the uplink signal transmitted from the PMS in order to achieve a diversity gain. The detector 620 may combine at least two pieces of soft decision information; at least two pieces of hard decision information; or at least two pieces of digital information to more accurately detect the information bits of the uplink signal. The first system may gain an improved uplink data transmission rate since use of the cooperation signal lowers the error occurrence in the detected information bits.

The evaluator 630 may evaluate a contribution of the cooperation signal with respect to detection of the uplink signal. The evaluator 630 may evaluate the contribution of the cooperation signal based on an improvement of a data transmission rate of the uplink signal; an improvement of an SNR caused by the cooperation signal; or the amount of interference caused in the first system by the second system's use of the available radio resource.

The radio resource management unit 640 may control the available radio resource according to the contribution of the cooperation signal. Specifically, as the contribution of the cooperation signal increases, the radio resource management unit 640 may allocate a relatively larger amount of available radio resources to the second system.

The PBS may control the available radio resource allocated to the second system in real time and may also improve the entire throughput of the first system and the second system.

Figure 7:
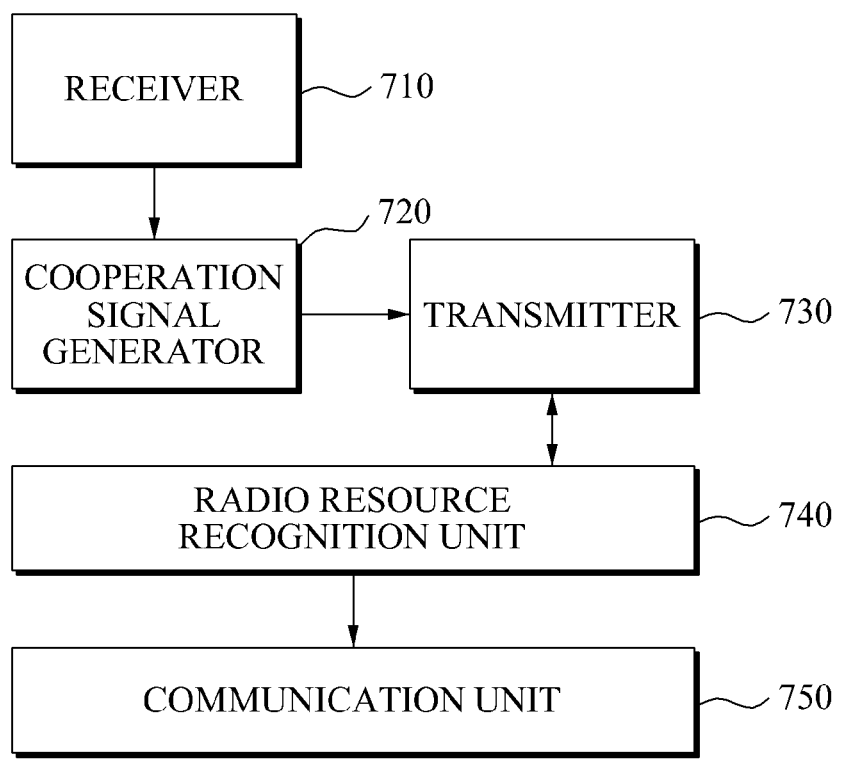
FIG. 7 is a block diagram illustrating an exemplary second base station.

FIG. 7 is a block diagram illustrating an SBS 430. The SBS 430 may include a receiver 710, a cooperation signal generator 720, a transmitter 730, a radio resource recognition unit 740, and a communication unit 750. The receiver 710 may receive an uplink signal of a PMS. A logical connection may not exist between the SBS 430 and the PMS. In this case, the receiver 710 may overhear the uplink signal of the PMS. The cooperation signal generator 720 may generate a cooperation signal associated with at least one of soft decision information for performing soft decision for the received uplink signal; hard decision information for performing hard decision for the received uplink signal; and digital information that is generated by quantizing the received uplink signal.

The transmitter 730 may transmit the cooperation signal to a PBS. The PBS may detect the uplink signal by processing the cooperation signal in order to achieve a diversity gain. The PBS may evaluate a contribution of the cooperation signal to allocate an available radio resource for the second system according to the evaluated contribution of the cooperation signal. The PBS may inform the second system of information associated with the allocated available radio resource. The radio resource recognition unit 740 may recognize the available radio resource allocated by the PBS based on information associated with the allocated available radio resource. The communication unit 750 may communicate with an SMS using the recognized available radio resource.

Figure 8:
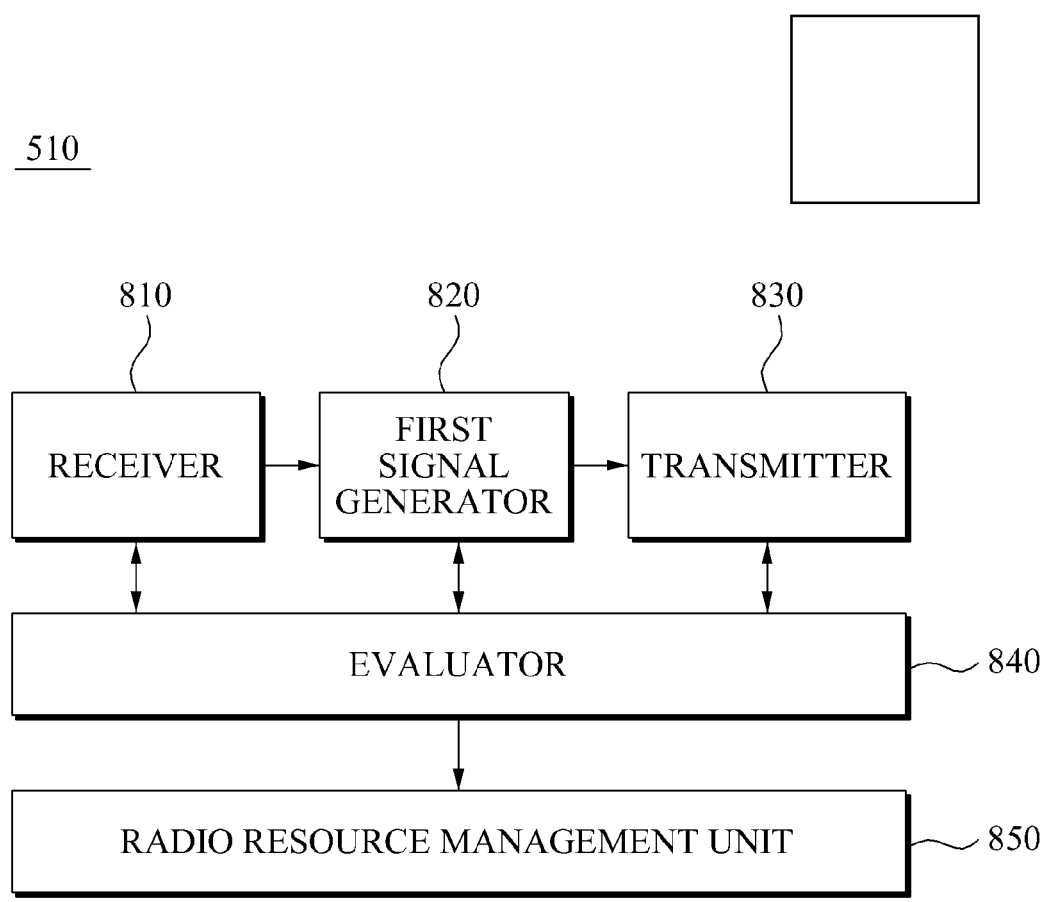
FIG. 8 is a block diagram illustrating another exemplary first base station.

FIG. 8 is a block diagram illustrating PBS 510. The PBS 510 may include a receiver 810, a first signal generator 820, a transmitter 830, an evaluator 840, and a radio resource management unit 850. The receiver 810 may receive an uplink signal from a source PMS. The uplink signal transmitted from the source PMS may be received by an SBS. The first signal generator 820 may generate a first signal associated with at least one of soft decision information for performing soft decision for the received uplink signal, digital information generated by quantizing the received uplink signal, and hard decision information for performing hard decision for the received uplink signal. The SBS may generate a second signal associated with at least one of the soft decision information; the hard decision information; and the digital information, based on the uplink signal received by the SBS and transmit the generated second signal to a destination PMS. The transmitter 830 may transmit the first signal to the destination PMS. The destination PMS may appropriately combine the first signal and the second signal to detect the uplink signal (i.e., information bits of the uplink signal). The evaluator 840 may evaluate a contribution of the second signal with respect to detection of the uplink signal of the destination PBS. The contribution of the second signal may be evaluated based on an improvement of a data transmission rate in the first system that is caused by existence of the second signal, and the like. The radio resource management unit 850 may control an available radio resource for the second system according to the contribution of the second signal.

Although not illustrated in FIGS. 1 through 8, the PBS may receive an uplink signal from a PMS and a cooperation signal associated with the uplink signal from a second system. The PBS may detect the received uplink signal using the received cooperation signal and evaluate a contribution of the cooperation signal with respect to detection of the uplink signal. The PBS may control an available radio resource for the second system according to the contribution of the cooperation signal.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A PBS may allocate an available radio resource to a second system according to a contribution of a cooperation signal of the second system with respect to an uplink communication of a first system to thereby improve throughput of the first system and the second system. A PBS may also allocate an available radio resource to a second system according to a contribution of a cooperation signal to thereby evenly allocate the available radio resource to the second system.

An SBS may facilitate an uplink communication of a first system using a cooperation signal to thereby improve an uplink channel capacity or an uplink data transmission of the first system. An SBS may generate a cooperation signal containing soft decision information to thereby effectively facilitate an uplink communication of a first system.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A base station in a first communication system, the base station comprising:

a receiver to receive an uplink signal from a mobile station and a cooperation signal from a second communication system, wherein the cooperation signal is associated with the uplink signal;

an evaluator to evaluate a contribution of the cooperation signal with respect to detection of the uplink signal; and a radio resource management unit to control an available radio resource for the second communication system according to the contribution of the cooperation signal, wherein the evaluator evaluates the contribution of the cooperation signal based on improvement of a data transmission rate of the uplink signal or improvement of a signal-to-noise ratio (SNR).

2. The base station of claim 1, wherein the evaluator evaluates the contribution of the cooperation signal further based on an amount of interference that is created in the first communication system from use of the controlled available radio resource.

3. The base station of claim 1, further comprising:
a detector to detect the received uplink signal using the received cooperation signal.

4. The base station of claim 3, wherein the detector detects the received signal by processing the received uplink signal and the received cooperation signal to achieve a diversity gain.

5. The base station of claim 3, wherein:
the base station generates first soft decision information of the received uplink signal for performing a soft decision of the uplink signal,
the cooperation signal includes second soft decision information generated by the second communication system for performing a soft decision of the uplink signal, and
the detector combines the first soft decision information and the second soft decision information to detect the received uplink signal.

6. The base station of claim 3, wherein the cooperation signal includes digital information indicating quantizing of a received signal of a second communication system, and the detector combines the quantized received signal of the digital information and the received uplink signal to detect the received uplink signal.

7. The base station of claim 3, wherein:
the base station generates first hard decision information for the received uplink signal for performing a hard decision of the uplink signal,
the cooperation signal includes second hard decision information generated by the second communication system for performing a hard decision of the uplink signal, and
the detector combines the first hard decision information and the second hard decision information to detect the received uplink signal.

8. The base station of claim 1, wherein the radio resource management unit increases availability of the available radio resource for the second communication system as the contribution of the cooperation signal increases.

9. The base station of claim 1, wherein the controlled available radio resource is configured to provide communication between a second base station and a second mobile station belonging to the second communication system.

10. The base station of claim 1, wherein the evaluator is configured to evaluate the contribution of the cooperation signal based on the improvement of the uplink signal received from the mobile station, and
the radio resource management unit is configured to control the available radio resource for the second communication system based on the improvement of the uplink signal from the mobile station.

11. A base station comprising:
a receiver to receive an uplink signal of a first mobile station;
a cooperation signal generator to generate:
a cooperation signal associated with at least one of soft decision information for performing a soft decision for the received uplink signal;
digital information that is generated by quantizing the received uplink signal; and
hard decision information for performing a hard decision for the received uplink signal;
a transmitter to transmit the cooperation signal to a second base station; and
a radio resource recognition unit to recognize an available radio resource allocated by the second base station based on a contribution of the cooperation signal with respect to detection of the uplink signal by the second base station,
wherein a contribution of the cooperation signal is based on improvement of a data transmission rate of the uplink signal or improvement of a signal-to-noise ratio (SNR).

12. The base station of claim 11, further comprising:
a communication unit to communicate with a second mobile station using the recognized available radio resource.

13. A base station of a first communication system, the base station comprising:
a receiver to receive an uplink signal from a source mobile station;
a first signal generator to generate a first signal associated with at least one of soft decision information for performing a soft decision for the received uplink signal, digital information that is generated by quantizing the received uplink signal, and hard decision information for performing a hard decision for the received uplink signal;
a transmitter to transmit the first signal to a destination mobile station;
an evaluator to evaluate a contribution of a second signal generated by a second communication system, the second signal associated with the received uplink signal, with respect to the destination mobile station detecting the received uplink signal; and
a radio resource management unit to control availability of radio resource to a second communication system according to the evaluated contribution of the second signal,
wherein the evaluator evaluates the contribution of the cooperation signal based on improvement of a data transmission rate of the uplink signal or improvement of a signal-to-noise ratio (SNR).

14. The base station of claim 13, wherein the evaluator evaluates the contribution of the second signal based on the amount of interference that is caused in the first communication system when the second communication system uses the controlled available radio resource.

15. A method of operating a base station in a first communication system, comprising:
receiving at a receiver an uplink signal from a mobile station and a cooperation signal from a second communication system, wherein the cooperation signal is associated with the uplink signal;
detecting by a detector the received uplink signal using the received cooperation signal;
evaluating by an evaluator a contribution of the cooperation signal with respect to detection of the uplink signal; and controlling by a radio resource management unit availability of radio resource to the second communication system according to the contribution of the cooperation signal,
wherein the evaluator evaluates the contribution of the cooperation signal based on improvement of a data transmission rate of the uplink signal or improvement of a signal-to-noise ratio (SNR).

16. The method of claim 15, wherein evaluating comprises evaluating the contribution of the cooperation signal based on an amount of interference that is caused in the first communication system when the second communication system uses the controlled available radio resource.

17. The method of claim 15, further comprising:
generating first soft decision information of the received uplink signal for performing soft decision of the received uplink signal, wherein
receiving comprises receiving the cooperation signal which includes second soft decision information generated by the second communication system for performing soft decision for the uplink signal, and
detecting comprises combining the first soft decision information and the second soft decision information to detect the received uplink signal.

18. A non-transitory computer-readable recording medium storing a program configured to cause abuse station to:
receive an uplink signal from a mobile station and a cooperation signal from a second communication system, wherein the cooperation signal is associated with the uplink signal;
detect the received uplink signal using the received cooperation signal;
evaluate a contribution of the cooperation signal with respect to detection of the uplink signal; and
control availability of a radio resource to the second communication system according to the contribution of the cooperation signal,
wherein the evaluating of the contribution of the cooperation signal is based on improvement of a data transmission rate of the uplink signal or improvement of a signal-to-noise ratio (SNR).

* * * * *